(12) United States Patent
Reed et al.

(10) Patent No.: US 10,133,795 B2
(45) Date of Patent: Nov. 20, 2018

(54) PERSONALIZED METRIC TRACKING

(71) Applicant: salesforce.com, inc., San Francisco, CA (US)

(72) Inventors: Cameron Rose Reed, Berkeley, CA (US); Lajja Mehta, Medford, MA (US); Kapil Reddy Gowru, Austin, TX (US); Pierre-Marie Dartus, Levallois-Perret (FR); Angela Lee Sy, Stanford, CA (US)

(73) Assignee: salesforce.com, inc., San Francisco, CA (US)

( * ) Notice: Subject to any disclaimer, the term of this patent is extended or adjusted under 35 U.S.C. 154(b) by 375 days.

(21) Appl. No.: 14/665,139

(22) Filed: Mar. 23, 2015

(65) Prior Publication Data

US 2016/0098467 A1    Apr. 7, 2016

Related U.S. Application Data

(60) Provisional application No. 62/060,254, filed on Oct. 6, 2014.

(51) Int. Cl.
*G06F 17/30* (2006.01)
*G06Q 10/06* (2012.01)

(52) U.S. Cl.
CPC . *G06F 17/30557* (2013.01); *G06Q 10/06398* (2013.01)

(58) Field of Classification Search
CPC .............................................. G06F 17/30557
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |

(Continued)

OTHER PUBLICATIONS

U.S. Appl. No. 13/998,890.
U.S. Appl. No. 13/998,065.
U.S. Appl. No. 13/986,251.

*Primary Examiner* — William Bashore
*Assistant Examiner* — Nathan Shrewsbury
(74) *Attorney, Agent, or Firm* — Dergosits & Noah LLP; Todd A. Noah

(57) ABSTRACT

A system, method and apparatus for providing real-time tracking of user personalized metrics from a database are provided. A request is received from a user device for personalized metrics data from a customer relationship management (CRM) application. A home page user interface is transmitted for display on the user device. The home page user interface provides several icons for user selection, where each of the several icons corresponds to a unique personal metrics category. A selection of one of the several icons is received. A user interface for a personal metrics category corresponding to the selected icon is transmitted for display on the user device. The user interface provides for display on the user device at least one personalized metrics data corresponding to the personal metrics category.

20 Claims, 12 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,183,560 B2* | 11/2015 | Abelow ............... G06Q 10/067 |
| 2001/0044791 A1 | 11/2001 | Richter et al. |
| 2002/0019810 A1* | 2/2002 | Kumar, Sr. ........ G06F 17/30867 |
| | | 705/42 |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian P et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0096973 A1* | 5/2005 | Heyse ................. G06Q 10/105 |
| | | 705/7.39 |
| 2007/0016871 A1* | 1/2007 | Magnifico ........ G06F 17/30286 |
| | | 715/764 |
| 2008/0012701 A1* | 1/2008 | Kass .................... A61B 5/0002 |
| | | 340/539.11 |
| 2008/0109158 A1* | 5/2008 | Huhtala .............. A63B 24/0021 |
| | | 701/439 |
| 2008/0294663 A1* | 11/2008 | Heinley ............... G06F 3/0481 |
| 2009/0063415 A1 | 3/2009 | Chatfield et al. |
| 2009/0100342 A1 | 4/2009 | Rueben et al. |
| 2009/0177744 A1 | 7/2009 | Marlow et al. |
| 2012/0016868 A1* | 1/2012 | Wagenblatt .......... G06Q 10/109 |
| | | 707/722 |
| 2012/0069131 A1* | 3/2012 | Abelow ............... G06Q 10/067 |
| | | 348/14.01 |
| 2012/0212505 A1* | 8/2012 | Burroughs .......... G06F 19/3481 |
| | | 345/629 |
| 2012/0233137 A1 | 9/2012 | Jakobson et al. |
| 2013/0066677 A1* | 3/2013 | Killoh ............... G06Q 30/0276 |
| | | 705/7.29 |
| 2013/0218948 A1 | 8/2013 | Jakobson |
| 2013/0218949 A1 | 8/2013 | Jakobson |
| 2013/0218966 A1 | 8/2013 | Jakobson |
| 2013/0245966 A1* | 9/2013 | Burroughs .......... G06F 19/3481 |
| | | 702/44 |
| 2014/0046711 A1* | 2/2014 | Borodow ......... G06Q 10/063114 |
| | | 705/7.15 |
| 2014/0106331 A1* | 4/2014 | Mitalski .................. G09B 5/08 |
| | | 434/350 |

(56) References Cited

U.S. PATENT DOCUMENTS

| | | | |
|---|---|---|---|
| 2014/0106876 A1* | 4/2014 | Knutsson | A63F 13/12 463/31 |
| 2014/0108113 A1* | 4/2014 | O'Connor | G06Q 30/0214 705/14.16 |
| 2014/0123072 A1* | 5/2014 | Bhowmick | G06F 3/0482 715/838 |
| 2014/0236663 A1* | 8/2014 | Smith | G06Q 10/0633 705/7.27 |
| 2014/0336796 A1* | 11/2014 | Agnew | A43B 3/0005 700/91 |
| 2014/0359537 A1 | 12/2014 | Jakobson et al. | |
| 2015/0007050 A1 | 1/2015 | Jakobson et al. | |
| 2015/0112776 A1* | 4/2015 | Murphy | G06Q 30/0211 705/14.13 |
| 2015/0112880 A1* | 4/2015 | Blaylock, IV | G06Q 50/01 705/319 |
| 2015/0199872 A1* | 7/2015 | George | G07F 17/3237 463/31 |
| 2015/0273342 A1* | 10/2015 | Olson | G06Q 30/0202 463/43 |
| 2015/0302525 A1* | 10/2015 | Vioni | G06Q 40/02 705/36 R |
| 2015/0346972 A1* | 12/2015 | Boekling | G06T 11/206 703/2 |
| 2016/0089574 A1* | 3/2016 | Henning | G06F 19/3481 700/91 |

\* cited by examiner

900

Personal Bests $8 million — Biggest Deals
Acme
March 2014

$8 million — Biggest Month
March 2014

4 deals — Most Deals Closed in a Month
April 2014

0 day — Fastest Deal
American Express
August 2014

9 calls — Most Calls Logged In a Day
July 17, 2014

1000

Pipeline opportunities

1001

321 AMEX 3.0

321 AMEX 2.0

321 AMEX 4.0

Merger with Starbucks

Other Today —1201

Think of next steps with client

Look up sales rep at General Mills

Discuss strategy with manager

Create live demo recording of Pulse

Send cupcakes to Blake

Log deals today

Send thank you note to client

PERSONALIZED METRIC TRACKING

CLAIM OF PRIORITY

This application claims the benefit of U.S. Provisional Patent Application 62/060,254 entitled PERSONALIZED METRIC TRACKING, by Cameron Rose Reed et al., filed Oct. 6, 2014, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to computer systems and software, and, more particularly, to systems and methods for tracking personalized metrics with a mobile electronic device.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The efficient retrieval and subsequent delivery of this information to the user system in a manner that is easy to understand has been and continues to be a goal of administrators of database systems.

The growing popularity of cloud computing and software as a service ("SaaS") has led to the development of software platforms for businesses and other enterprises that provide more advanced cloud-based products and services, in addition to simple data storage and management requirements. Salesforce.com inc., of San Francisco, Calif., offers a number of customer relationship management ("CRM") products and services that are cloud-based solutions upon which relevant applications can be launched and/or built for any business or enterprise, and can be integrated with the data storage and management services of a multi-tenant database system.

For example, the Salesforce1 platform is used for the development and deployment of mobile enterprise applications. The Salesforce1™ platform is built on a core integrated development environment ("IDE") called Force.com™, which is a set of tools and services for creating and launching employee-facing applications that are both mobile and social. The Force.com platform includes a number of standard applications, which may be extended by customization, or custom applications may be created. The Force.com platform also includes access to a store for applications called the AppExchange, which is similar to the iTunes™ App Store, but for business applications.

A feature of the Salesforce CRM software is the ability for CRM users to have real-time access to CRM data, organized into logical objects for the enterprise, such as Leads, Accounts, Opportunities, Contacts, etc., for a sales organization. However, while users have access to lots of CRM data, it would be desirable to have a real-time tool for users to visualize and track their own performance in securing sales, for example. Accordingly, it is desirable to provide a tool that allows users to monitor certain metrics in an interesting and engaging manner.

BRIEF SUMMARY

A system, method and apparatus for real-time tracking of user personalized metrics from a database using a mobile electronic device.

A system, method and apparatus for providing real-time tracking of user personalized metrics from a database are provided. A request is received from a user device for personalized metrics data from a customer relationship management (CRM) application. A home page user interface is transmitted for display on the user device. The home page user interface provides several icons for user selection, where each of the several icons corresponds to a unique personal metrics category. A selection of one of the several icons is received. A user interface for a personal metrics category corresponding to the selected icon is transmitted for display on the user device. The user interface provides for display on the user device at least one personalized metrics data corresponding to the personal metrics category.

In some implementations, the selection of one of the plurality of icons may be received as one of touching the icon on a touchscreen device, clicking the icon with a pointer device, or a series of swiping actions on the touchscreen device from the home page user interface. In some instances, the icons provided for user selection on the home page user interface include, for example, icons for a deals page, an activities page, a leaderboard page, and a personal best page. Each of the deals page, the activities page, and the leaderboard page may include a menu for selecting a temporal characteristic, where the temporal characteristic represents a time period for which personalized metrics are presented for each of the respective pages. The temporal characteristic may further be customized by the user or an administrator of the CRM application.

In various implementations, each of the deals page and the activities page may provide a progress bar that provides a graphical representation of user progress for each of the respective pages. The personalized metrics may be presented as an absolute numerical value, a percentage numerical value, a bar graph, and/or a hierarchical chart. Furthermore, the transmitted user interface for the personal metrics category provides several additional icons that are selectable by the user. When a selection of one of the several additional icons is received, a detailed view of data corresponding to the selected additional icon is provided for display.

Such a tool can be provided as an application, thereby allowing users to monitor their metrics in an interesting and engaging manner. The application described herein is a tool for enterprises that allows users to view their personalized real-time metrics based on their CRM data. This solution allows users to filter their data in real-time according to time, type of records, and other users in a simple and engaging overview. The visible metrics on the tool are customizable such that users can easily reflect on their activities for any chosen period of time. In addition, users have the ability to drill down and initiate action for any of the data shown using the tool.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 10 illustrates an example UI that provides a list that includes opportunities on which the user may drill down.

DETAILED DESCRIPTION

Figure 1:
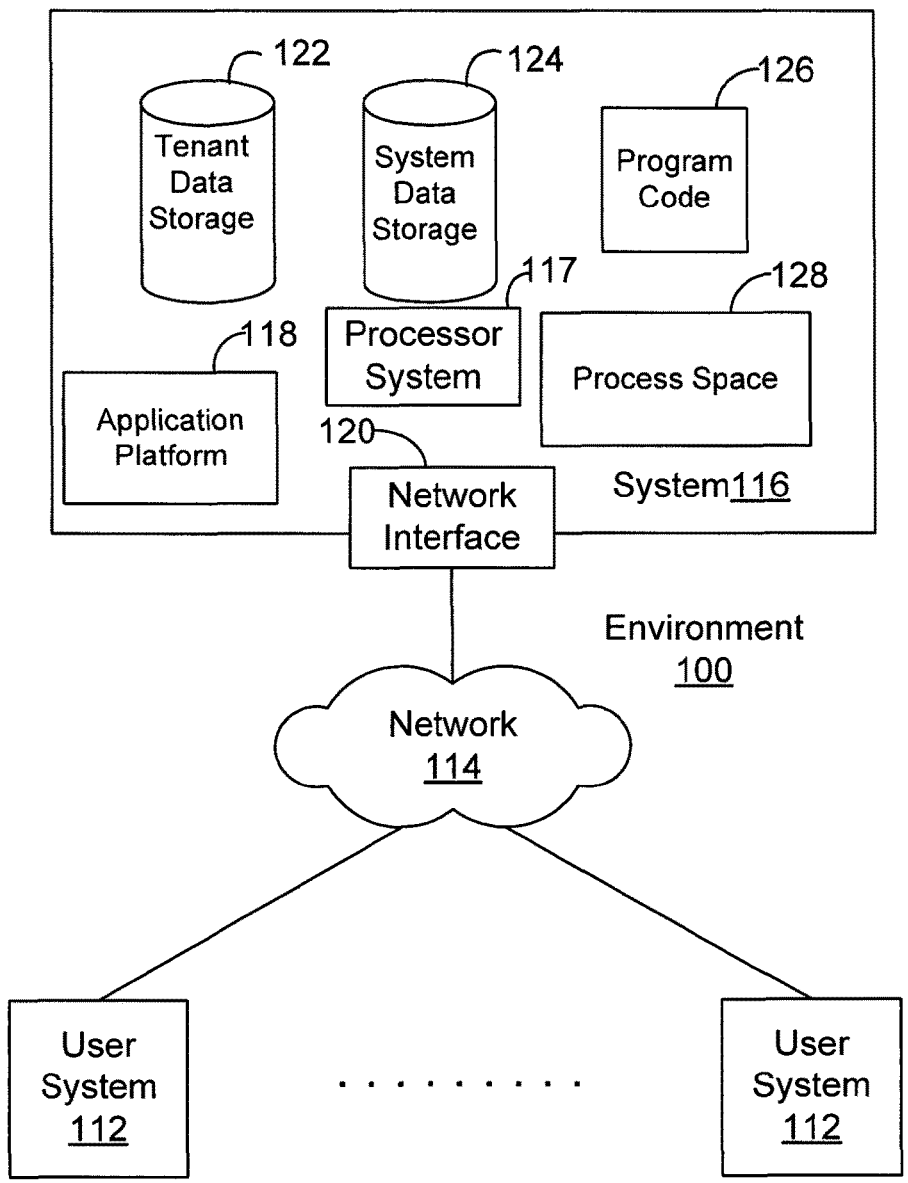
FIG. 1 shows a block diagram of an example of an environment in which an on-demand database service can be used in accordance with some implementations.

Systems and methods are provided for real-time tracking of user personalized metrics from a database using a mobile electronic device. Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks" or "steps," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer program products for providing tracking of user personalized metrics from a database. A personalized metrics tracker may interact with data provided on the Internet or intranet of a company, and may include a variety of categories of numerical and textual data. In some implementations, the disclosed methods, apparatus, systems, and computer program products may be configured or designed for use in a multi-tenant database environment.

These and other implementations described and reference herein may be embodied in various types of hardware, software, firmware, of combinations of these. For example, some techniques disclosed herein may be implemented, at least in part, by machine-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of machine-readable media include, but are not limited to, magnetic media such as hard disks, floppy disks, and magnetic tape; optical media such as CD-ROM disks; magneto-optical media; and hardware devices that are specially configured to store program instructions, such as read-only memory devices ("ROM") and random access memory ("RAM") devices. These and other features of the disclosed implementations will be described in more detail below with reference to the associated drawings.

The terms "client device," "user system", and "client side user system" are used interchangeably herein and generally refer to handheld computing devices, mobile phones, laptop computers, work stations, and/or any variety of computing devices that includes a network connection. The term client device may refer to a computing device that is operated by an end user at a location remote from a server to which the client device is communicatively coupled.

The term "multi-tenant database system" can refer to those systems in which various elements of hardware and software of a database system may be shared by one or more customers. For example, a given application server may simultaneously process requests for a great number of customers, and a given database table may store rows for a potentially much greater number of customers. The term "query plan" generally refers to one or more operations used to access information in a database system.

A "user profile" or "user's profile" is generally configured to store and maintain data about the user of the database system. The data can include general information, such as title, phone number, a photo, a biographical summary, and a status (e.g., text describing what the user is currently doing). As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a subscriber (custom object). For example, a record can be for a business partner or potential business partner (e.g., a client, vendor, distributor, etc.) of the user, and can include an entire company, subsidiaries, or contacts at the company. As another example, a record can be a project that the user is working on, such as an opportunity (e.g., a possible sale) with an existing partner, or a project that the user is trying to get. In one implementation of a multi-tenant database, each record for the tenants has a unique identifier stored in a common table. A record has data fields that are defined by the structure of the object (e.g., fields of certain data types and purposes). A record can also have custom fields defined by a user. A field can be another, record or include links thereto, thereby providing a parent-child relationship between the records.

FIG. 1 shows a block diagram of an example of an environment 100 in which an on-demand database service can be used in accordance with some implementations. Environment 100 may include user systems 112, network 114, database system 116, processor system 117, application platform 118, network interface 120, tenant data storage 122, system data storage 124, program code 126, and process space 128. In other implementations, environment 100 may not have all of these components and/or may have other components instead of, or in addition to, those listed above.

Environment 100 is an environment in which an on-demand database service exists. User system 112 may be any machine or system that is used by a user to access a database system 116. For example, any of user systems 112 can be a handheld computing device, a mobile phone, a laptop computer, a work station, and/or a network of such computing devices. As illustrated in FIG. 1 user systems 112 might interact via a network 114 with an on-demand database service, which is implemented in the example of FIG. 1 as database system 116.

An on-demand database service, such as system 116, is a database system that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 118 may be a framework that allows the applications of system 116 to run, such as the hardware and/or software, e.g., the operating system. In some implementations, application platform 118 enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a user is using a particular user system 112 to interact with system 116, that user system has the capacities allotted to that user. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. Network 114 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a "browser" for sending and receiving HTTP signals to and from an HTTP server at system 116. Such an HTTP server might be implemented as the sole network interface 120 between system 116 and network 114, but other techniques might be used as well or instead. In some implementations, the network interface 120 between system 116 and network 114 includes load sharing functionality, such as round-robin HTTP request distributors to balance loads and distribute incoming HTTP requests evenly over a plurality of servers. At least for users accessing system 116, each of the plurality of servers has access to the MTS' data; however, other alternative configurations may be used instead.

In one implementation, system 116, shown in FIG. 1, implements an application that allows users to monitor certain performance metrics. For example, in one implementation, system 116 includes application servers configured to implement and execute a performance metrics presentation applications as well as provide related data, code, forms, web pages and other information to and from user systems 112 and to store to, and retrieve from, a database system related data, objects, and Webpage content. With a multi-tenant system, data for multiple tenants may be stored in the same physical database object in tenant data storage 122, however, tenant data typically is arranged in the storage medium(s) of tenant data storage 122 so that data of one tenant is kept logically separate from that of other tenants so that one tenant does not have access to another tenant's data, unless such data is expressly shared. In certain implementations, system 116 implements applications other than, or in addition to, a performance metrics presentation application. For example, system 116 may provide tenant access to multiple hosted (standard and custom) applications, including a social networking application. User (or third party developer) applications, which may or may not include social networking applications, may be supported by the application platform 118, which manages creation, storage of the applications into one or more database objects and executing of the applications in a virtual machine in the process space of the system 116.

One arrangement for elements of system 116 is shown in FIG. 1, including a network interface 120, application platform 118, tenant data storage 122 for tenant data 223, system data storage 124 for system data accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 112 and all of its components are operator configurable using applications, such as a browser, including computer code run using a central processing unit such as an Intel Pentium® processor or the like. Similarly, system 116 (and additional instances of an MTS, where more than one is present) and all of its components might be operator configurable using application(s) including computer code to run using processor system 117, which may be implemented to include a central processing unit, which may include an Intel Pentium® processor or the like, and/or multiple processor units.

A computer program product implementation includes a non-transitory machine-readable storage medium (media) having instructions stored thereon/in, which can be used to program a computer to perform any of the processes/methods of the implementations described herein. Computer program code 126 for operating and configuring system 116 to intercommunicate and to process web pages, applications and other data and media content as described herein is preferably downloadable and stored on a hard disk. The entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 116 is configured to provide web pages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations.

Additionally, the term "server" is meant to refer to a computing device or system, including processing hardware and process space(s), an associated storage system such as a memory device or database, and, in some instances, a database application (e.g., OODBMS or RDBMS) as is well known in the art. It should also be understood that "server system" and "server" are often used interchangeably herein.

Similarly, the database objects described herein can be implemented as single databases, a distributed database, a collection of distributed databases, a database with redundant online or offline backups or other redundancies, etc., and might include a distributed database or storage network and associated processing intelligence.

Figure 2:
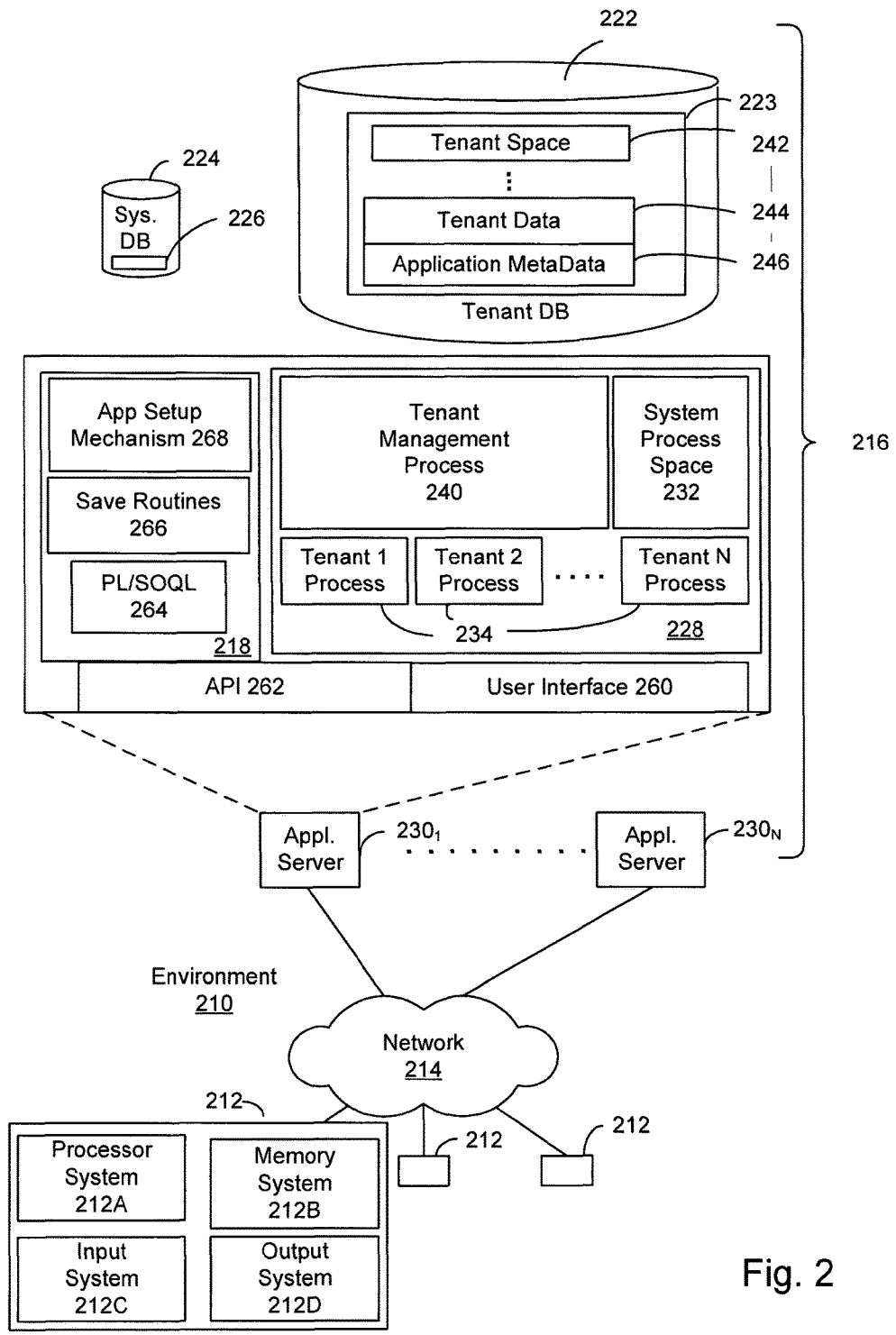
FIG. 2 illustrates a block diagram of an embodiment of elements of FIG. 1 and various possible interconnections between these elements.

FIG. 2 illustrates environment 210. However, in FIG. 2 elements of system 216 and various interconnections in an embodiment are further illustrated. FIG. 2 shows that user system 212 may include processor system 212A, memory system 212B, input system 212C, and output system 212D. FIG. 2 shows network 214 and system 216. FIG. 2 also shows that system 216 may include tenant data storage 222, tenant data 223, system data storage 224, system data 226, User Interface (UI) 260, Application Program Interface (API) 262, PL/SOQL 264, save routines 266, application setup mechanism 268, applications servers $230_1$-$230_N$, system process space 232, tenant process spaces 234, tenant management process 240, tenant storage area 242, user storage 244, and application metadata 246. In other embodiments, environment 210 may not have the same elements as those listed above and/or may have other elements instead of, or in addition to, those listed above.

User system 112, network 114, system 116, tenant data storage 122, and system data storage 124 were discussed above in FIG. 1. Regarding user system 212, processor system 212A may be any combination of one or more processors. Memory system 212B may be any combination of one or more memory devices, short term, and/or long term memory. Input system 212C may be any combination of input devices, such as one or more keyboards, mice, trackballs, scanners, cameras, touch screens, and/or interfaces to networks. Output system 212D may be any combination of output devices, such as one or more monitors, printers, and/or interfaces to networks.

As shown by FIG. 2, system 216 may include a network interface 120 (of FIG. 1) implemented as a set of HTTP application servers 230, an application platform 218, process space 228 for executing MTS system processes and tenant-specific processes, tenant data storage 222, and system data storage 224. Also shown is system process space 232, including individual tenant process spaces 234 and a tenant management process 240. Each application server 230 may be configured to tenant data storage 222 and the tenant data 223 therein, and system data storage 224 and the system data 226 therein to serve requests of user systems 212. The tenant data 223 might be divided into individual tenant storage areas 242, which can be either a physical arrangement and/or a logical arrangement of data. Within each tenant storage area 242, user storage 244 and application metadata 246 might be similarly allocated for each user. For example, a copy of a user's most recently used (MRU) items might be stored to user storage 244. Similarly, a copy of MRU items for an entire organization that is a tenant might be stored to tenant storage area 242. A UI 260 provides a user interface and an API 262 provides an application programmer interface to system 216 resident processes to users and/or developers at user systems 212. The tenant data and the system data may be stored in various databases, such as one or more Oracle® databases.

Application platform 218 includes an application setup mechanism 268 that supports application developers' creation and management of applications, which may be saved as metadata into tenant data storage 222 by save routines 266 for execution by subscribers as one or more tenant process spaces 234 managed by tenant management process 240 for example. Invocations to such applications may be coded using PL/SOQL 34 that provides a programming language style interface extension to API 262. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manage retrieving application metadata 246 for the subscriber making the invocation and executing the metadata as an application in a virtual machine.

Each application server 230 may be communicably coupled to database systems, e.g., having access to system data 226 and tenant data 223, via a different network connection. For example, one application server $230_1$ might be coupled via the network 214 (e.g., the Internet), another application server $230_{N-1}$ might be coupled via a direct network link, and another application server $230_N$ might be coupled by yet a different network connection. Transfer Control Protocol and Internet Protocol (TCP/IP) are typical protocols for communicating between application servers 230 and the database system. However, it will be apparent to one skilled in the art that other transport protocols may be used to optimize the system depending on the network interconnect used.

In certain embodiments, each application server 230 is configured to handle requests for any user associated with any organization that is a tenant. Because it is desirable to be able to add and remove application servers from the server pool at any time for any reason, there is preferably no server affinity for a user and/or organization to a specific application server 230. In one embodiment, therefore, an interface system implementing a load balancing function (e.g., an F5 Big-IP load balancer) is communicably coupled between the application servers 230 and the user systems 212 to distribute requests to the application servers 230. In one embodiment, the load balancer uses a least connections algorithm to route user requests to the application servers 230. Other examples of load balancing algorithms, such as round robin and observed response time, also can be used. For example, in certain embodiments, three consecutive requests from the same user could hit three different application servers 230, and three requests from different users could hit the same application server 230. In this manner, system 216 is multi-tenant, wherein system 216 handles storage of, and access to, different objects, data and applications across disparate users and organizations.

As an example of storage, one tenant might be a performance metrics company that provides an application where users can engage the application via system 216 to manage a profile and view different performance metrics. Thus, a user might maintain contact data, messages, performance information, and digital media (such as pictures, videos, hyperlinks, etc.) corresponding to that user's profile (e.g., in tenant data storage 222). In an example of a MTS arrangement, since all of the data and the applications to access, view, modify, transmit, receive, etc., can be maintained and accessed by a user system having nothing more than network access, the user can manage his or her profiles and communications from any of many different user systems. For example, if a user is accessing the application using a mobile device that has Internet access, the user can obtain the same information updates as that user can obtain using any other type of devices, whether public or private, as long as the user logs into his or her own account.

While each user's data might be separate from other users' data regardless of the networks of each user, some data might be organization-wide data shared or accessible by a plurality of users or all of the users for a given organization that is a tenant. Thus, there might be some data structures managed by system 216 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 216 might also maintain system level data usable by multiple tenants or other data. Such system level data might include industry reports, news, postings, and the like that are sharable among tenants.

In certain embodiments, user systems 212 (which may be client systems) communicate with application servers 230 to request and update system-level and tenant-level data from system 216 that may require sending one or more queries to tenant data storage 222 and/or system data storage 224. System 216 (e.g., an application server 230 in system 216) automatically generates one or more SQL statements (e.g., one or more SQL queries) that are designed to access the desired information. System data storage 224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a social networking application database may include a table that describes a user with fields for basic contact information such as name, location, email, etc. Another table might describe organizations with which the user is affiliated, including fields for information such as home town, school(s) attended, work, affinity groups, etc. In some multi-tenant database systems, standard entity tables might be provided for use by all tenants. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Figure 3:
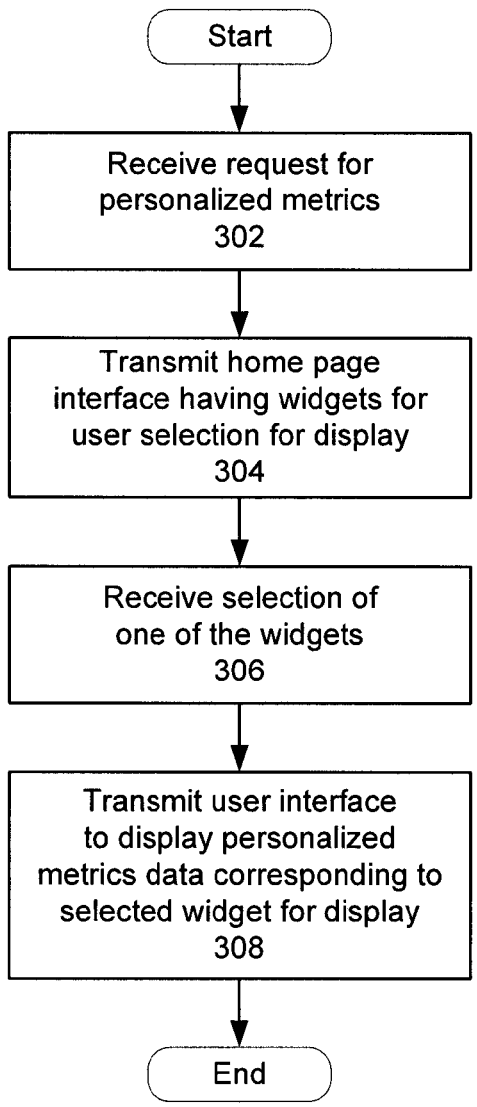
FIG. 3 depicts an operational flow diagram illustrating a high level overview of a technique for providing personalized metric tracking in an embodiment.

FIG. 3 depicts an operational flow diagram illustrating a high level overview of a technique for real-time tracking of user personalized metric from a database. In 302, a request for personalized metrics data is received from a CRM application running on a user device. Upon receiving the request, a home page user interface is transmitted for display on the user device in 304. The home page interface provides several icons for user selection, where each of the icons corresponds to a unique personal metrics category. In 306, a selection of one of the plurality of icons is received from the user device. When the selection is received, a user interface for a personal metrics category corresponding to the selected icon for display on the user device is transmitted for display on the user device in 308. The user interface provides for display at least one personalized metrics data corresponding to the personal metrics category on the user device.

Figure 4:
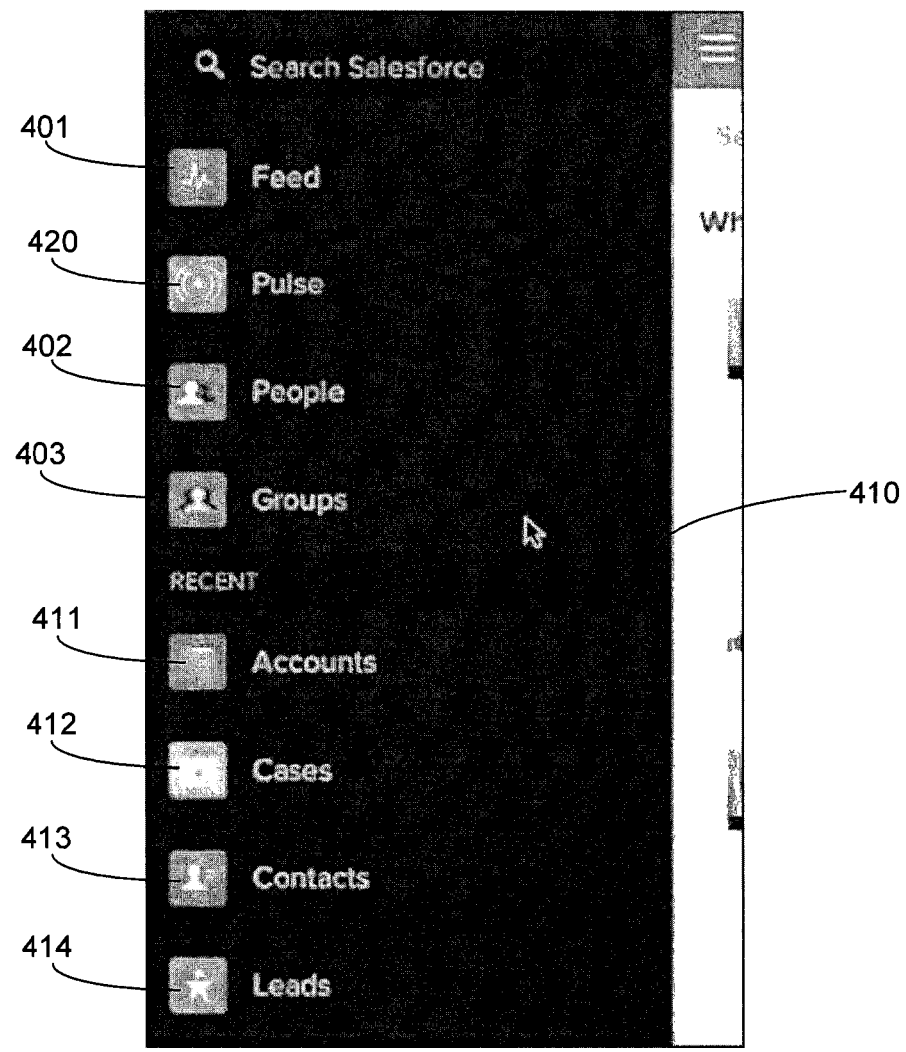
FIG. 4 illustrates an example user interface (UI) of the application for monitoring metrics rendered on the display screen of a mobile electronic device.

FIG. 4 illustrates an example UI 400 of the application for monitoring metrics rendered on the display screen of a mobile electronic device, such as a smartphone, tablet, laptop, etc., which is configured within the Salesforce1 platform. Several common top level applications, such as Feed 401, People 402, and Groups 403, may be listed above bar 410. These applications listed above the bar may be static, and will be shown in UI 400 each time the stage-left bar is accessed. Additionally, recent applications maybe be listed below bar 410, and may includes applications related to Accounts 411, Cases 412, Contacts 413 and Leads 414. These applications may be dynamic, and may change based on user behavior. As shown in this example, the four most recently accessed applications populate the area below bar 410.

A personal metrics application 420, e.g., Pulse™ metric tracking and reporting software, may be included above the bar 410 in this example. The personal metrics application 420 is configured to provide access to and for the display of a variety of personalized metrics for the user. The personalized metrics may be calculated over a designated period of time. For example, the personalized metrics may be calculated for the current day or week, or for the duration of a particular project. The duration may be preset or user and/or administrator designated. By selecting personal metrics application 420 on UI 400, a new UI is displayed.

Figure 5:
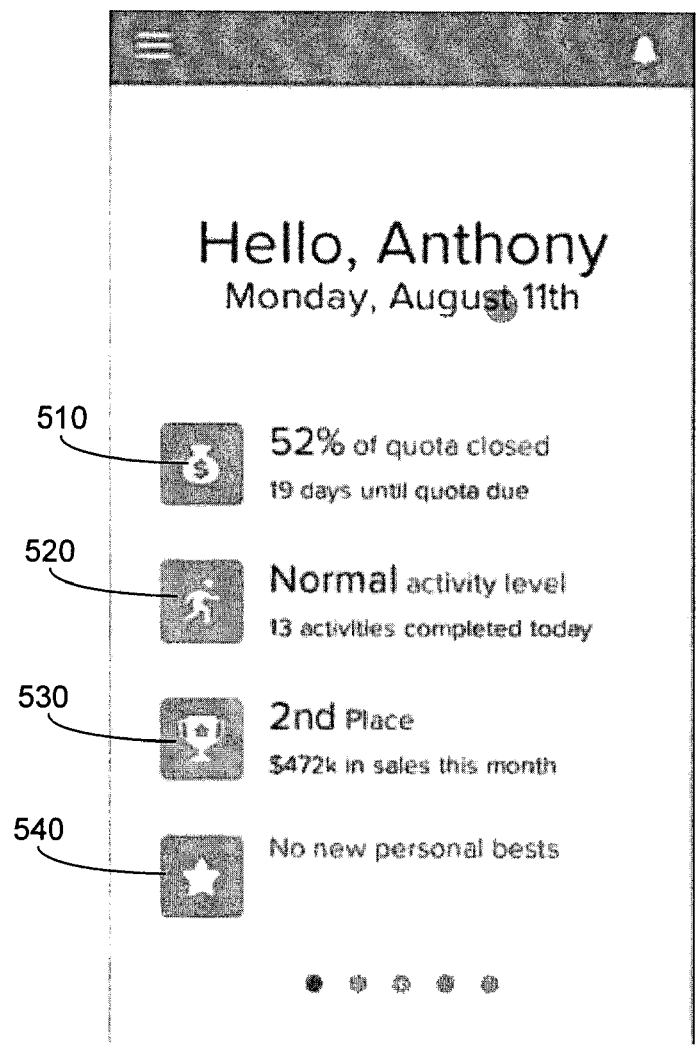
FIG. 5 illustrates an example home page for the application that shows various metrics pages provided to a user.

FIG. 5 illustrates an example home page for the application that shows various metrics pages provided to a user. This new UI is displayed when personal metrics application 420 is selected on UI 400. The personal metrics home page 500 shows the various metrics "cards" or pages that a user may select for review. In this example a Deals card 510, an Activities card 520, a Leaderboard card 530, and a Personal Bests card 540 populate the page.

Figure 6:
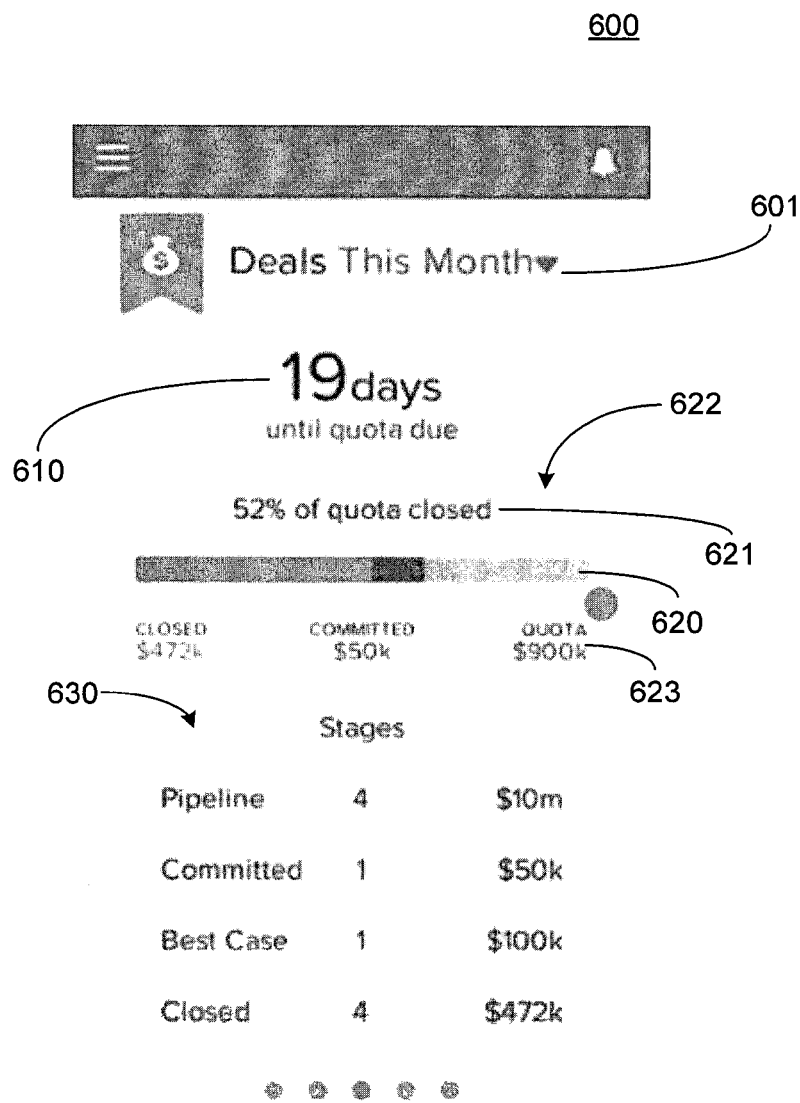
FIG. 6 illustrates an example UI page that provides a summary of the status of all deals in progress for the user in a particular period.

Selecting the Deals card 510 by touching the icon on a touchscreen or clicking the icon with a pointer device, or swiping the display to the right from personal metrics home page 500 generates Deals page 600. FIG. 6 illustrates an example UI page that provides a summary of the status of all deals in progress for the user over a particular period of time. A selectable dropdown menu 601 at the top of Deals page 600 allows the user to choose a period for which the user wishes the personal metrics be shown for. In this example, the chosen period is "This Month" and all the data displayed on the page indicates the user's performance for the current calendar month. Other periods may include, but are not limited to, "Today," "This Week," "This Year," etc.

Days remaining indicator 610 displays the number of days remaining in the chosen month. For example, days remaining indicator 610 here shows that the user has 19 days remaining in the month to achieve his sales quota for the month. The number of days remaining may be customized by the user or administrator to reflect a specific end time, whether it be a specific day of a month/year, or a specific number of days to completion.

Display area 620 is a multi-part display of the user's performance on closing deals against his quota for the period. A top portion 621 of display area 620 is a simple text display that indicates the percentage of deals that the user has closed, e.g., 52%. A progress bar 620 is provided in a middle portion 622 of the display area and indicates several aspects of the user's quota for deals over a specified period. In this example, the total quota for the period is $900 k, where $50 k of deals have been committed but not yet closed. The example in FIG. 6 also shows that $472 k of deals that have been closed. The closed, committed and quota amounts are all listed in the text display 623.

Summary display 630 is a multi-part display that provides a further breakdown of each deal by stages. Summary display 630 shows, for each stage, the number of deals in which the user is engaged (for the specific period), and the corresponding value of each deal. The example shown in FIG. 6 includes 4 deals in the Pipeline stage, one deal in the Committed state, one deal in the Best Case stage, and four deals in the Closed stage, with the respective amounts of $10 m, $50 k, $100 k and $472 k. Thus, Deals page 600 provides the user an easy to read snapshot of deals in which the user is involved, along with some easy to read performance metrics.

Figure 7:
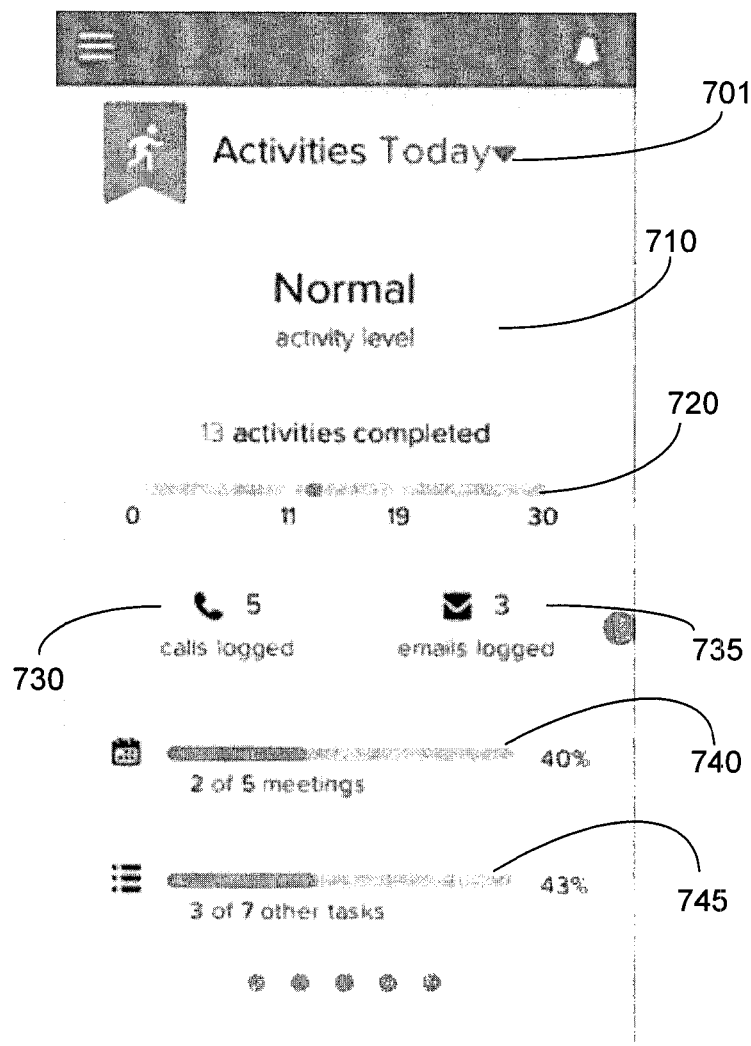
FIG. 7 illustrates an example UI page that provides a summary of the status of all activities of the user in a particular period.

Selecting the Activities card 520 by touching the icon on a touchscreen or clicking the icon with a pointer device from personal metrics home page 500, or swiping the display to the right from Deals page 600 generates Activities page 700. FIG. 7 illustrates an example UI page that provides a summary of the status of all activities of the user in a particular period. A selectable dropdown menu 701 at the top of Activities page 700 allows the user to choose a period for which the user wishes the personal metrics be shown for. In this example, the chosen period is "Today" and all the data displayed on the page indicates the user's performance on scheduled activities for today. Other periods may include, but are not limited to, "This Month," "This Week," "This Year," etc.

Activities indicator 710 is a simple display that indicates whether the user's performance of activities is high, normal, or low, based on either pasts performance or customized settings. Progress bar 720 depicts the number of activities completed on a normalized scale, and a text display above the progress bar indicates the specific number of activities completed.

Call log display 730 provides an indication of the number of calls logged during the specified period (e.g., 6 calls logged in the example shown in FIG. 7), while email long display 735 provides an indication of the number of emails logged during the specified period (e.g., 3 emails logged in the example shown in FIG. 7). Meeting bar 740 is a progress bar that indicates the number of meeting attended during the period, while task bar 745 is a progress bar that indicates the number of other tasks that have been performed during the period. In addition to meeting bar 740 and task bar 745, a text display above below each of the bars provide an indication of the number of meetings/tasks completed versus the total number of meeting/tasks. To the side of the meeting bar 740 and task bar 745, text is displayed to indicate the percentage of meetings/tasks completed based on the total number of meetings/tasks.

Figure 8:
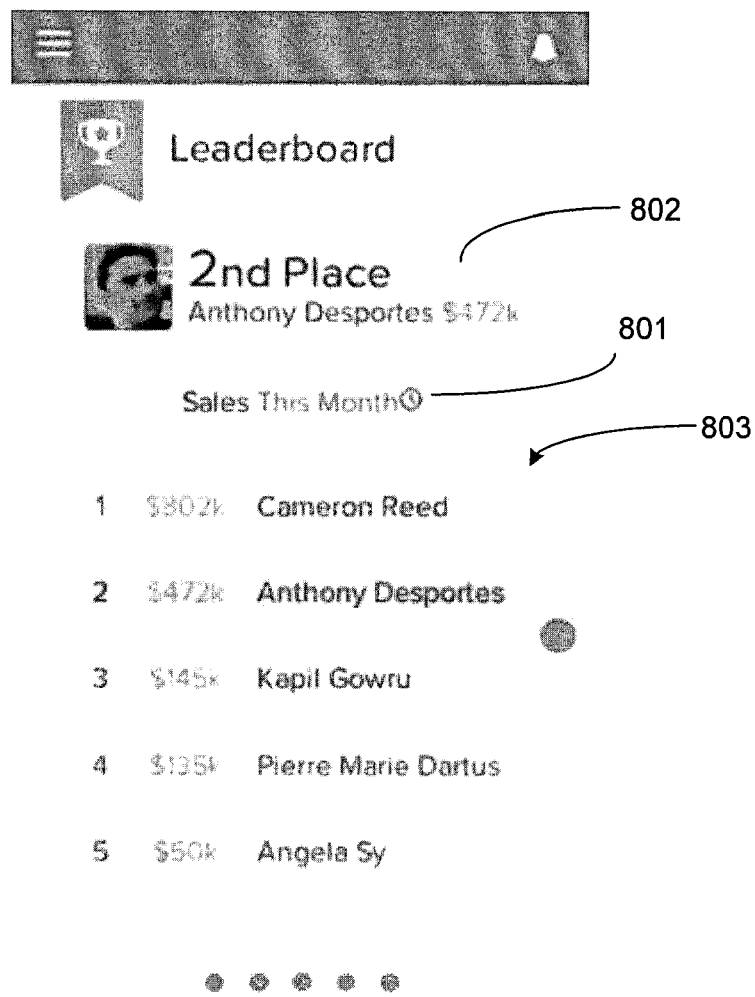
FIG. 8 illustrates an example UI page that provides a summary of how the user performs compared with other members of the user's team.

Selecting the Leaderboard card 530 by touching the icon on a touchscreen or clicking the icon with a pointer device from home page 500, or swiping the display to the right from the Activities page 700 generates Leaderboard page 800. FIG. 8 illustrates an example UI page that provides a summary of how the user performs compared with other members of the user's team. A selectable dropdown menu 801 at the top of Leaderboard page 800 allows the user to choose a period for which the user wishes the personal metrics be shown for. In this example, the chosen period is "This Month." Other periods may include, but are not limited to, "Today," "This Week," "This Year," etc. Header 802 shows the user and the user's position among the leaders, e.g., $2^{nd}$ place in this instance. Leaderboard list 803 is also displayed showing the top five leading performers for closing deals during this month. The user's position on Leaderboard list 803 is highlighted for easy identification. In the example shown in FIG. 8, the user is in the second position on Leaderboard list 803.

Figure 9:
FIG. 9 illustrates an example UI page that provides a summary of the user's best performances in various measures.
Figure 9:

Selecting the Personal Bests card 540 by touching the icon on a touchscreen or clicking the icon with a pointer device from personal metrics home page 500, or swiping the display to the right from the Leaderboard page, generates Personal Best page 900. FIG. 9 illustrates an example UI page that provides a summary of the user's best performances in various measures. This page is updated, for example, in real-time, or when new information is available. In the example shown in FIG. 9, personal bests are displayed for the following categories: biggest deals, biggest month, most deals closed in a month, fastest deal, and most calls logged in a day. The categories shown are simply provided as exemplary categories. A user and/or administrator may customize or created categories for display that correspond to different characteristics.

Figure 11:
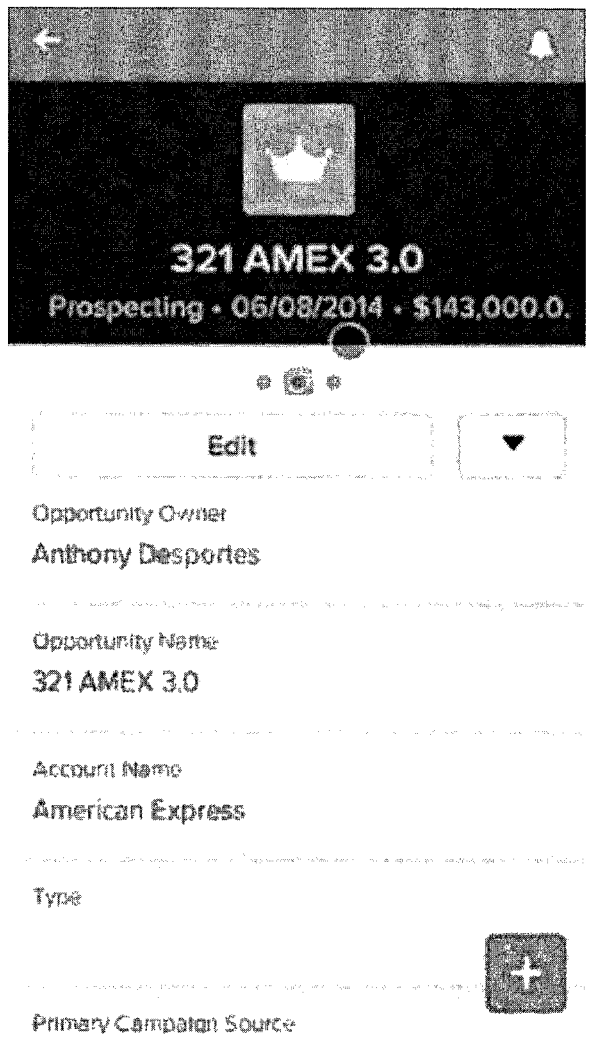
FIG. 11 illustrates an example UI that provides an opportunity selected by a user from the Salesforce1 platform.

The metrics application can also be configured so that users can drill down deeper into the data. For example, if the user wants to review information about a specific deal, from the Deals page 600, the user selects one of the listed stages, such as Pipeline, and all the deals in that stage will be shown on a list 1001 on Pipeline page 1000, as depicted in FIG. 10. Pipeline page 1000 illustrates an example UI that provides a list 1001 that includes opportunities on which the user may drill down. For example, selecting one of the four displayed opportunities will lead to a display 1100 of the selected opportunity directly from a platform such as the salesforce1™ platform, as illustrated in FIG. 11, which depicts an example UI that provides an opportunity selected by a user from the Salesforce1 platform.

Figure 12:
FIG. 12 illustrates an example UI that provides a list of all tasks for a chosen period.
Figure 12:

The user may interact with other parts of the metrics application. For example, upon reviewing the Activities page 700, the user may realize that another activity has been completed but not yet logged. Thus, the user can click on or select the "other tasks" progress bar 745 (i.e., drill down on the "other tasks" progress bar 745) to be shown a list 1201 of all the tasks for the chosen period on page 1200, as illustrated in FIG. 12. Clicking on a particular task takes the user to the task display in the platform (e.g., Salesforce1 platform), and the user can edit the task including indicating completion of the task.

The examples described above should not be taken as limiting or preferred. These examples sufficiently illustrate the technology disclosed without being overly complicated, and are not intended to illustrate all embodiments of the technology disclosed. A person having ordinary skill in the art will appreciate that there are many potential applications for one or more implementations of this disclosure.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for providing real-time tracking of user personalized metrics from a database system, the method comprising:
receiving, by the database system, a request from a user computing device for personalized metrics data from a customer relationship management (CRM) application, the personalized metrics data being unique to a user who is requesting the personalized metrics data, the database system comprising a collection of objects, each object in the collection of objects containing personalized metrics data fitted into one of a plurality of unique personal metrics categories;
transmitting, by the database system, a first user interface for display on the user computing device, the user interface providing a plurality of selectable icons in response to receiving the request for personalized metrics data, each of the plurality of icons corresponding to one of the plurality of unique personal metrics category that is unique to the user who is requesting the personalized metrics data;
receiving, by the database system, a selection of one of the plurality of icons corresponding to a unique personal metrics category that is unique to the user who is requesting the personalized metrics data; and
transmitting, by the database system, a second user interface for a personal metrics category corresponding to the selected icon for display on the user device, the user interface providing at least one personalized metrics data calculated for a period of time corresponding to the personal metrics category, the at least one personalized metrics data being unique to the user who is requesting the personalized metrics data.

2. The method of claim 1, wherein the selection of one of the plurality of icons may be received as one of touching the icon on a touchscreen computing device, clicking the icon with a pointer device, or a series of swiping actions on the touchscreen computing device from the first user interface.

3. The method of claim 1, wherein the plurality of selectable icons provided on the first user interface comprises icons for a deals page, an activities page, a leaderboard page, and a personal best page.

4. The method of claim 3, wherein each of the deals page, the activities page, and the leaderboard page comprises a menu for selecting a temporal characteristic, wherein the temporal characteristic represents a time period for which personalized metrics are presented for each of the respective pages.

5. The method of claim 4, wherein the temporal characteristic is further customizable by at least one of the user or an administrator of the CRM application.

6. The method of claim 3, wherein each of the deals page and the activities page provides a progress bar that provides a graphical representation of user progress for each of the respective pages.

7. The method of claim 3, wherein the personalized metrics are presented as at least one of an absolute numerical value, a percentage numerical value, a bar graph, or a hierarchical chart.

8. The method of claim 3, wherein the transmitted second user interface provides a plurality of additional icons selectable by the user,
the method further comprising:
receiving, by the database system, a selection of one of the plurality of additional icons, and
providing, by the database system, for display on the user computing device a detailed view of data corresponding to the selected additional icon.

9. A computer program product comprising a non-transitory computer-readable medium having computer readable program code embodied therein to be executed by one or more processors, the program code including instructions to:
receive, by the database system, a request from a user computing device for personalized metrics data from a customer relationship management (CRM) application, the personalized metrics data being unique to a user who is requesting the personalized metrics data, the database system comprising a collection of objects, each object in the collection of objects containing personalized metrics data fitted into one of a plurality of unique personal metrics categories;
transmit, by the database system, a first user interface for display on the user computing device, the first user interface providing a plurality of selectable icons in response to receiving the request for personalized metrics data, each of the plurality of icons corresponding to one of the plurality of unique personal metrics category that is unique to the user who is requesting the personalized metrics data;
receive, by the database system, a selection of one of the plurality of icons corresponding to a unique personal metrics category that is unique to the user who is requesting the personalized metrics data; and
transmit, by the database system, a second user interface for a personal metrics category corresponding to the selected icon for display on the user computing device, the user interface providing for display on the user computing device at least one personalized metrics data calculated for a period of time corresponding to the personal metrics category, the at least one personalized metrics data being unique to the user who is requesting the personalized metrics data.

10. The computer program product of claim 9, wherein the plurality of selectable icons on the first user interface comprises icons for a deals page, an activities page, a leaderboard page, and a personal best page.

11. The computer program product of claim 10, wherein each of the deals page, the activities page, and the leaderboard page comprises a menu for selecting a temporal characteristic, wherein the temporal characteristic represents a time period for which personalized metrics are presented for each of the respective pages.

12. The computer program product of claim 11, wherein the temporal characteristic is further customizable by at least one of the user or an administrator of the CRM application.

13. The computer program product of claim 10, wherein each of the deals page and the activities page provides a progress bar that provides a graphical representation of user progress for each of the respective pages.

14. The computer program product of claim 10, wherein the personalized metrics are presented as at least one of an absolute numerical value, a percentage numerical value, a bar graph, or a hierarchical chart.

15. The computer program product of claim 10, wherein the transmitted second user interface for the personal metrics category provides a plurality of additional icons selectable by the user, the program code further including instructions to:
receive, by the database system, a selection of one of the plurality of additional icons, and
provide, by the database system, for display on the user computing device a detailed view of data corresponding to the selected additional icon.

16. A system for providing real-time tracking of user personalized metrics from a database system, the system comprising:
one or more processors; and
a non-transitory computer readable medium storing a plurality of instructions, which when executed, cause the one or more processors to:
receive, by the database system, a request from a user computing device for personalized metrics data from a customer relationship management (CRM) application, the personalized metrics data being unique to a user who is requesting the personalized metrics data, the database system comprising a collection of objects, each object in the collection of objects containing personalized metrics data fitted into one of a plurality of unique personal metrics categories;
transmit, by the database system, a first user interface for display on the user computing device, the first user interface providing a plurality of selectable icons in response to receiving the request for personalized metrics data, each of the plurality of icons corresponding to one of the plurality of unique personal metrics category that is unique to the user who is requesting the personalized metrics data;
receive, by the database system, a selection of one of the plurality of icons corresponding to a unique personal metrics category that is unique to the user who is requesting the personalized metrics data; and
transmit, by the database system, a second user interface for a personal metrics category corresponding to the selected icon for display on the user computing device, the user interface providing for display on the user computing device at least one personalized metrics data calculated for a period of time corresponding to the personal metrics category, the at least one personalized metrics data being unique to the user who is requesting the personalized metrics data.

17. The system of claim 16, wherein the plurality of selectable icons provided on the first user interface comprises icons for a deals page, an activities page, a leaderboard page, and a personal best page.

18. The system of claim 17, wherein each of the deals page, the activities page, and the leaderboard page comprises a menu for selecting a temporal characteristic, wherein the temporal characteristic represents a time period for which personalized metrics are presented for each of the respective pages.

19. The system of claim 17, wherein the personalized metrics are presented as at least one of an absolute numerical value, a percentage numerical value, a bar graph, or a hierarchical chart.

20. The system of claim 17, wherein the transmitted second user interface for the personal metrics category provides a plurality of additional icons selectable by the user,
the computer readable medium further storing instruction to:
receive, by the database system, a selection of one of the plurality of additional icons, and
provide, by the database system, for display on the user computing device a detailed view of data corresponding to the selected additional icon.

* * * * *